United States Patent [19]
Mamyshev et al.

[11] Patent Number: 5,473,458
[45] Date of Patent: Dec. 5, 1995

[54] SOLITON DATA TRANSMISSION USING NON-SOLITON TRANSMITTER

[75] Inventors: Pavel V. Mamyshev, Middletown; Linn F. Mollenauer, Colts Neck, both of N.J.

[73] Assignee: AT&T Corp., Murray Hill, N.J.

[21] Appl. No.: 364,644

[22] Filed: Dec. 27, 1994

[51] Int. Cl.$^6$ .................................................. H04B 10/00
[52] U.S. Cl. ......................... 359/161; 359/173; 359/181
[58] Field of Search ................................. 359/134, 159, 359/160–161, 173, 181, 183, 188

[56] References Cited

U.S. PATENT DOCUMENTS

| | | | |
|---|---|---|---|
| 4,635,263 | 1/1987 | Mollenauer | 372/3 |
| 5,140,656 | 8/1992 | Hasegawa et al. | 359/173 |
| 5,357,364 | 10/1994 | Gordon et al. | 359/173 |

OTHER PUBLICATIONS

"Transform–Limited Pulse Generation in the Gigahertz Region From a Gain–Switched Distributed–Feedback Laser Diode Using Spectral Windowing", Optics Letters, vol. 15, No. 12 Jun. 15. 1990, pp. 715–717.

"Transform–Limited 1.4ps Optical Pulses From a Monolithic Colliding–Pulse Mode–Locked Quantum Well Laser" Appl. Phys. Lett. vol. 57, No. 8 Aug. 20, 1990, pp. 759–761.

"Generation of Fundamental Soliton Trains for High–Bit–Rate Optical Fiber Communication Lines" IEEE Journal of Quantum Electronics, vol. 27, No. 10 Oct. 1991, pp. 2347–2355.

"Harmonically Mode–Locked Fiber Ring Laser With an Internal Fabry–Perot Stabilizer for Soliton Transmission" Optics Letters, vol. 18, No. 2 Jan. 15, 1993, pp. 107–109.

"Transform–Limited Optical Pulse Generation Up to 20–GHz Repetition Rate by a Sinusoidally Driven InGaAsP Electroabsorption Modulator" Journal of Lightwave Technology, vol. 11, No. 3 Mar. 1993, pp. 468–473.

*Primary Examiner*—Leo H. Boudreau
*Assistant Examiner*—Kinfe-Michael Negash
*Attorney, Agent, or Firm*—Gregory C. Ranieri

[57] ABSTRACT

Method and apparatus of soliton transmission using a non-soliton source are described. The soliton transmission is generally in the form of an optical pulse sequence, Intensity and phase modulation of a continuous wave optical signal generates a pair of optical pulse sequences related to Stokes and anti-Stokes components of the doubly modulated optical signal. By proper alignment of the optical frequency of the cw optical signal with the passband of a filtered transmission line, it is possible to have the filtered transmission line comprising sliding frequency-guiding filters permit only one of the pulse sequences to be selected and thereby form a soliton pulse sequence.

13 Claims, 4 Drawing Sheets

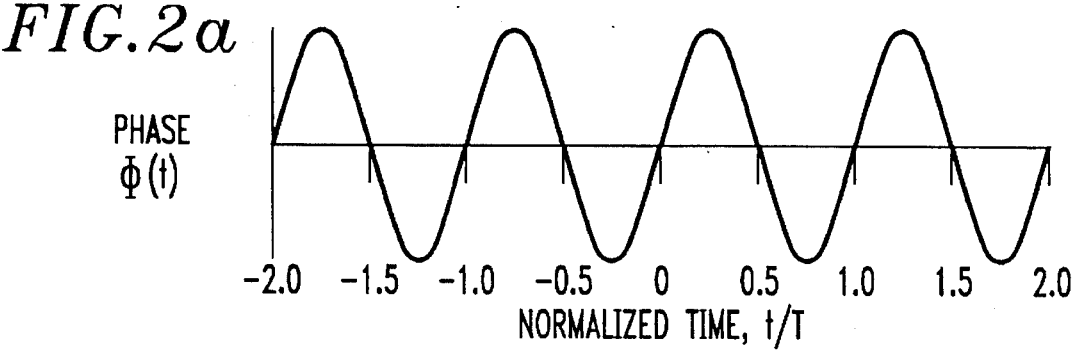
FIG.2a PHASE φ(t)
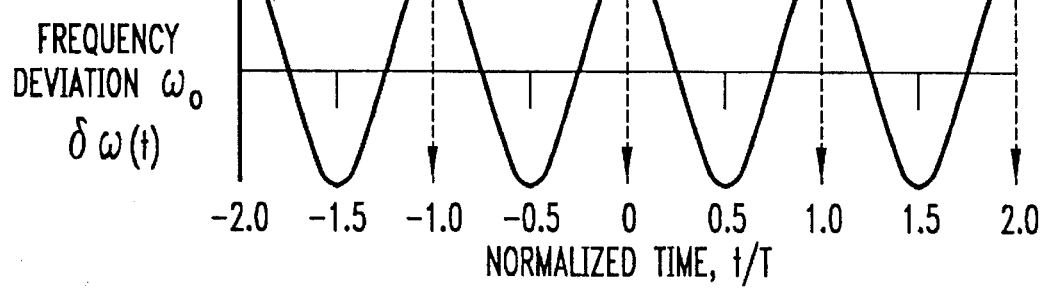
FIG.2b FREQUENCY DEVIATION ω₀ δω(t)
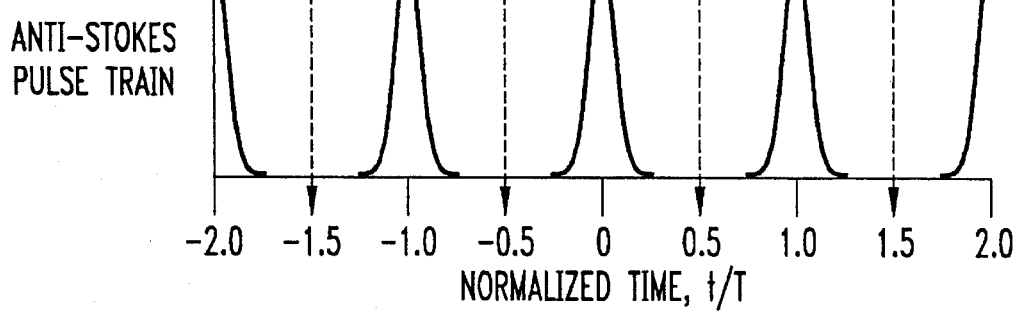
FIG.2c ANTI-STOKES PULSE TRAIN
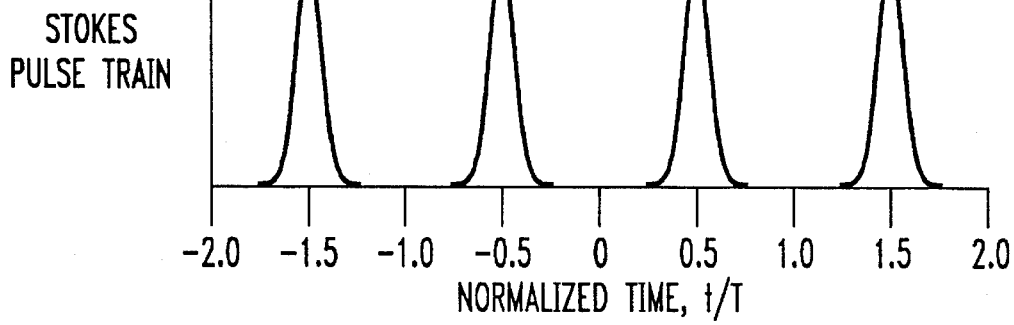
FIG.2d STOKES PULSE TRAIN

SOLITON DATA TRANSMISSION USING NON-SOLITON TRANSMITTER

CROSS-REFERENCE TO RELATED APPLICATION

This application is related to co-pending U.S. patent application Ser. No. 08/223,915 (P. V. Mamyshev Case 1), filed Apr. 6, 1994.

TECHNICAL FIELD

This invention relates to an apparatus and a method for generating a sequence of optical pulses and, more particularly, for generating transform-limited pulses which are useful in soliton transmission systems.

BACKGROUND OF THE INVENTION

Numerous methods have been explored in recent years for generating high repetition rate sequences of nearly transform-limited, hyperbolic secant shaped pulses. These pulses are required for optical soliton transmission. Generally, the proposed methods and apparatus tend to exhibit one or more drawbacks, such as excessive timing jitter, extreme chirp, alignment difficulties, poor mechanical stability, high cost, and sensitivity to modulator bias drift.

SUMMARY OF THE INVENTION

These drawbacks have been overcome by the method and its related apparatus described in the aforementioned U.S. Patent application. According to this technique, a continuous wave ("cw") optical source has its output phase-modulated and filtered to extract one or both of the upper ("anti-Stokes component") or lower ("Stokes component") frequency sidebands. Each sideband includes the components necessary to obtain a nearly transform-limited sequence of optical pulses. The pulses appear at a repetition rate determined by the frequency of the phase modulation. These pulse sequences are unaffected by bias drift inherent in most practical modulators and therefore exhibit a high degree of long term stability. While this technique solves the problems found in most prior soliton sources, it adds the requirements that the sideband filters remain reasonably closely tuned to the particular sideband of the cw laser and that each filter have a relatively sharp cutoff in its frequency response.

We have now discovered that all the advantages of the present technique can be preserved and the disadvantage posed the latter requirements of the present technique can be eliminated by a new system for transmitting solitons based on the source described immediately above combined with a transmission system utilizing sliding frequency-guiding filters. It employs a cw optical source having its output periodically phase-modulated so that one sideband coincides to a predetermined degree with the passband of the first sliding frequency-guiding filter in the transmission system. In this new arrangement, the mean frequency or wavelength in the sideband used for transmission need not be perfectly aligned with the transmission peak frequency or wavelength of the first sliding frequency-guiding filter. The sliding frequency-guiding filters tolerate a large non-soliton component at the input to the transmission system.

BRIEF DESCRIPTION OF THE DRAWING

A more complete understanding of the invention may be obtained by reading the following description of specific illustrative embodiments of the invention in conjunction with the appended drawing in which:

FIGS. 2(a)–2(d) show signal plots of the phase modulation, frequency deviation and resulting Stokes and anti-Stokes pulse sequences for exemplary operation of the apparatus in FIG. 1;

DETAILED DESCRIPTION

Figure 1:
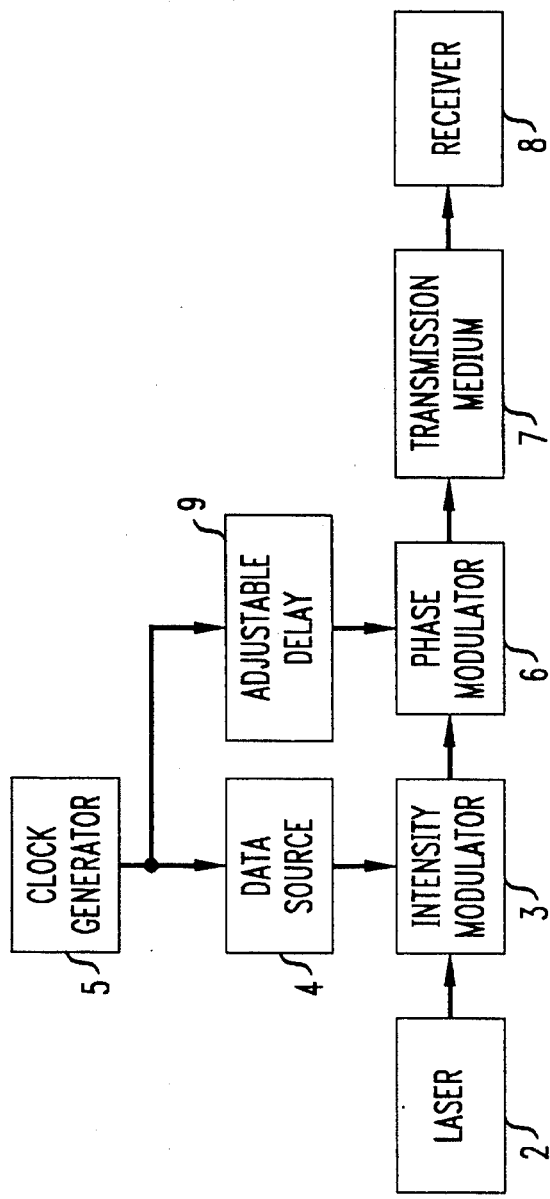
FIG. 1 is a simplified block of an exemplary optical system for soliton transmission using a non-soliton source in accordance with the principles of the present invention.

FIG. 1 shows an exemplary embodiment of apparatus for soliton transmission using a non-soliton source. The optical apparatus includes laser 2, intensity modulator 3, data source 4, clock signal generator 5, adjustable delay element 9, phase modulator 6, transmission system 7, and optical receiver 8. Each element from FIG. 1 will be described in more detail below together with an explanation of the theory of operation.

Laser 2 is generally operated in a continuous wave or cw mode. It is optically coupled to an external modulator shown in FIG. 1 as intensity modulator 3. Modulator 3 modulates the intensity of the optical signal output from laser 2. The modulation imparted to the laser signal may be either non-return to zero (NRZ) or return to zero (RZ) data encoding based upon the type of data supplied by data source 4.

Data source 4 generates the data used to modulate the cw optical signal from laser 2. Data are output from the data source in either the RZ or NRZ data encoding format at a bit rate controlled by a supplied clock signal. Clock signal generator 5 produces the clock signal corresponding to the predetermined data bit rate, e.g., a 10 GHz clock signal for 10 Gbps data.

Phase modulator 6 is optically coupled to the output of intensity modulator 3. The phase modulator imparts phase modulation information to the intensity modulated signal from modulator 3. In the embodiment shown in FIG. 1, the clock signal or a representation thereof (e.g., a sinusoidal signal rather than square wave signal) controls the instantaneous phase changes in modulator 6. As stated above, the clock signal supplied to the phase modulator operates at the bit rate frequency. The clock signal may be delayed to advance or retard the temporal position of the pulse sequences with respect to the mid-bit position defined by the clock signal as input to phase modulator 6. That is, each pulse is substantially centered within its corresponding bit period. This is shown clearly in FIGS. 2 and 4. The output from modulator 6 is provided to transmission system medium 7 for transmission to optical receiver 8.

Transmission medium 7 is a filtered transmission line capable of supporting soliton propagation. One example of such a filtered transmission line is the sliding frequency guiding soliton transmission system described in U.S. Pat. No. 5,357,364 and U.S. patent application Ser. No. 08/323,949 (L. F. Mollenauer Case 28), filed Oct. 17, 1994, the teaching in both being expressly incorporated by reference herein. A brief description of the soliton transmission system having sliding-frequency guiding filters is given below and is shown in FIG. 5.

Figure 5:
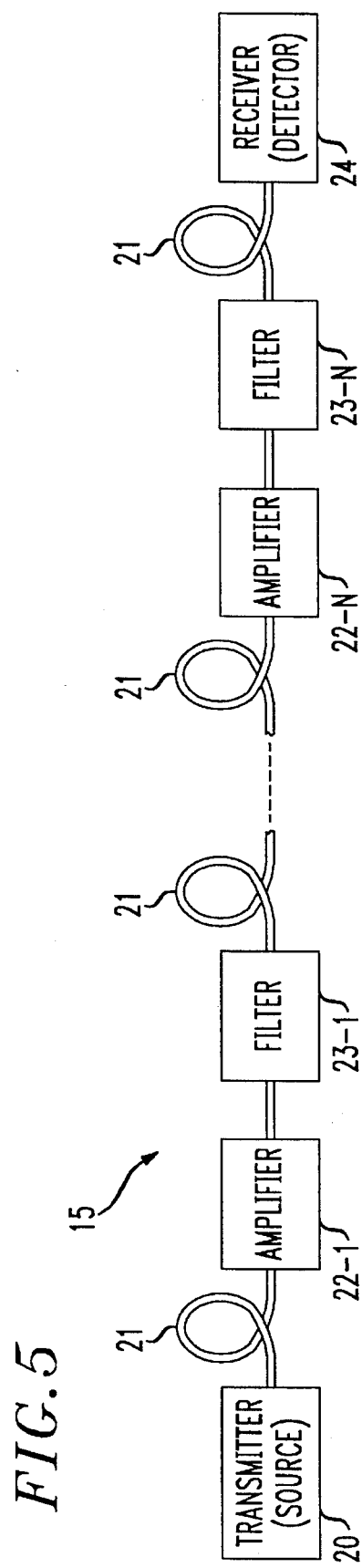
FIG. 5 shows a simplified block diagram including the transmission system suitable for use with the apparatus in FIG. 1.

It is understood that the transmitter (source) 20 in FIG. 5 is capable of operating in the same manner as the combination of elements 2 through 6 and 9 in FIG. 1.

Optical fiber transmission system 15 as shown in FIG. 5 typically includes a transmission medium, such as lengths of optical fiber 21, together with pairs of connected optical amplifiers and filters, such as amplifier 22-1 and filter 23-1. The amplifier and filter pairs are preferably disposed at predetermined intervals along the transmission system 15. For the purposes of the present invention, the filtered transmission line 7 in FIG. 1 can be realized by optical fiber transmission system 15, for example.

The transmission medium covers a system path length L between the transmitter 20 and the receiver 24. In most systems of interest such as transoceanic or transcontinental systems, the system path length is at least several thousand kilometers. Such long distance soliton transmission media are generally realized by a plurality of lengths of optical fiber 21 which are desirably single mode optical fibers having the appropriate group velocity dispersion for supporting soliton propagation at frequency $\Omega$ and at those frequencies caused by the action of the sliding-frequency guiding filters 23-1 through 23-N. Silica-based optical fibers are suitable for this application. Fibers employing different materials as well as different properties such as polarization preservation are contemplated for use herein.

In FIG. 5, optical amplifiers and filters are indicated by elements 22-1 through 22-N, and elements 23-1 through 23-N, respectively. Optical amplifiers 22-1 through 22-N may suitably comprise an optically pumped section of rare earth doped optical fiber, such as erbium doped optical fiber, to provide gain to pulses propagating at the soliton center frequency. Such amplifiers generally require a pump source for generating the optical pump beam and a means for coupling the pump beam into the optical amplifying medium. These elements are not shown in the FIGS. When operating with the associated filters, it is desirable that each amplifier compensate the loss related to insertion of the associated filter.

Each optical filter 23-1 through 23-N can be set to a nominal filter center frequency $\omega_{f,1}$ through $\omega_{f,N}$, respectively, where, in one illustrative embodiment, the nominal filter center frequencies are intentionally detuned from a reference frequency by some prescribed, varying amount. For example, the center frequency of the optical filters may be different from each other and from the nominal center frequency $\Omega$ of the soliton as it is launched into the relevant portion of the transmission system. This allows the use of stronger filters which, in turn, greatly reduces timing jitter problems in the soliton transmission system 15. In various embodiments of the soliton transmission system, the center frequency of each successive optical filter is translated up or translated down in a predetermined pattern such as frequency increasing, frequency decreasing, and combinations of both. From the system point of view for a particular channel, the associated filter frequencies are seen to be sliding with respect to an arbitrary reference frequency such as the launch frequency $\Omega$ of the solitons. Thus, filters realized in accordance with the teachings herein are now called "sliding-frequency guiding filters."

The use of the sliding-frequency guiding filters creates a transmission environment which is substantially opaque to noise while remaining perfectly transparent to solitons. Opacity to noise exists for all but a small fraction of the total system length. An alternative way of describing the transmission environment created by use of the invention is that it permits solitons to leave behind, at some fixed distance and in a different frequency band, the noise emanating from the amplification process. In essence, the solitons are adiabatically and intentionally dragged away in the frequency domain from their related amplified noise. In this new transmission system, solitons are launched at a particular frequency $\Omega$ and, as they propagate along the transmission medium, are accelerated toward successively different frequencies determined by each optical filter center frequency $\omega_{f,n}$ (n=1, 2, . . . N) for the series of sliding-frequency guiding filters thereby causing each soliton to emerge at a substantially different frequency from the launch frequency.

It should be noted that only the nonlinear (soliton) pulses can shift frequency along with the sliding-frequency guiding filters. The reason for this is that the nonlinear term in the propagation equation allows the soliton pulses to generate the new frequency components required for the sliding. "Linear" pulses including noise, on the other hand, cannot generate the required new frequencies and hence eventually suffer catastrophic energy loss from the action of the sliding filters. Thus, the invention described here takes advantage of the fact that the soliton pulses are nonlinear.

While various illustrative embodiments of the sliding frequency-guiding filters have been discussed above, it should be understood that optical filters 23-1 through 23-N can also be grouped together so that M consecutive filters form one group and so on. The center frequency for each filter within the same group can be nominally identical. But, the center frequency from one group to the next group can change in the same frequency sliding manner as prescribed above for individual filters which were not grouped.

For filters 23-1 through 23-N, the mean rate of change of nominal center frequency detuning as a function of distance is less than a prescribed maximum in soliton units which are defined below. If the maximum rate is exceeded, the soliton frequency can no longer follow the filters, leading eventually to the elimination of the soliton pulses. For a parabolically shaped filter peak response, the exemplary maximum mean rate was shown to be approximately $(2/27^{1/2})\eta$.

In FIG. 5, soliton shaped pulses of optical radiation are generated at a nominal soliton center frequency $\Omega$ a by the transmitter 20. The pulses are then coupled into the transmission medium where the frequencies of the pulses are translated by the action of sliding frequency filters 23-1 through 23-N. After transmission through the medium, the pulses are detected at the receiver 24. Unidirectional transmission is depicted in order to simplify the explanation of the principles of the present invention without limiting the scope of the invention. Isolators (not shown) can be provided between any of the amplifiers 22-1 through 22-N and filters 23-1 through 23-N in unidirectional systems, as is known in the art.

In general, creation of soliton pulses is dependent upon proper launch and transmission characteristics such as pulse power, pulse width, center frequency, fiber dispersion and the like. These characteristics are well known to those skilled in the art and will not be discussed further herein. For additional background information concerning soliton generation and soliton transmission, see *Optical Fiber Telecommunications II*, ed. S. E. Miller et al., pp. 90 et seq. (Academic Press 1988) and see also U.S. Pat. No. 4,406,516. However, we have discovered that these general launch characteristics can be significantly relaxed for the present inventive system because of the combination including the sliding frequency-guiding filters. The present invention allows a number of degrees of freedom in the appropriate launch conditions for pulses which will ultimately emerge from the transmission medium as solitons. For example, with the present invention, it is possible to launch pulses which are at least twice as broad temporally as the desirable pulse width; it is possible to use a considerably lower launch power than the desirable power; and it is possible to have the centroid (or mean frequency) of the sideband frequency spectrum located off-center with respect to the nominal center frequency of the filter passband. In one example, 30 ps pulses were launched into the transmission medium and formed into solitons even though the desirable pulse width for launching is approximately 15 ps. Similarly, in another example, pulses were launched into transmission medium 7 at approximately one-tenth the power level expected as a desirable launch condition for soliton creation and transmission. In the latter example, the sliding frequency-guiding filter transmission system compensated and solitons emerged in the system within several soliton unit lengths of transmission. Because the sliding frequency-guiding filters will accelerate the pulses in the frequency domain toward the nominal center frequency of each filter, the exact alignment of the centroid of the frequency spectrum for the pulse sequence with the nominal center frequency of the filters is unnecessary.

Optical filters 23-1 through 23-N may be realized from Fabry-Perot etalons, fiber Fabry-Perot etalons and the like. Fiber Fabry-Perot etalon filters are disclosed in U.S. Pat. No. 4,861,136, U.S. Pat. No. 4,830,451 and U.S. Pat. No. 5,037,180, which are incorporated by reference herein. A multiport optical filter utilizing a Fabry-Perot etalon for wavelength selectivity is described in U.S. Pat. No. 5,050,954. Other exemplary wavelength-tunable optical filters are described by H. Kobrinski et al. in *IEEE Communications Magazine*, pp. 53–63 (October 1989), also incorporated by reference herein. Etalons exhibit many desirable characteristics such as tunability, and a periodic comb characteristic which, in the latter instance, lends to their attractiveness for wavelength-division-multiplexing applications.

The sliding frequency filters 23-1 through 23-N for use in the present invention preferably have a parabolic-shaped filter response near the peak of its nominal center frequency. The strength of a parabolically shaped peak filter response is a function of the curvature of the peak. The greater the curvature, the greater the strength. The curvature per unit soliton length of a parabolically shaped filter response around the peak of its nominal center frequency is referred to as the filter strength $\eta$, where all quantities are in soliton units.

Filters may not have a response curve which lends itself easily to defining a center frequency because of a lack of 3 dB points on the curve. Nevertheless, the nominal center frequency of a filter is understood to be the frequency lying midway between the 3 dB points on a frequency response curve raised to an arbitrary power greater than unity which allows such 3 dB points to appear.

While providing pairs of amplifiers and filters is preferred, several amplifiers can be provided in series followed by a single filter. The filters 23-1 through 23-N are preferably spaced along the lengths of optical fibers 21, about 30–50 km apart. Larger spacings can be provided, but the spacing is preferably less than the soliton unit length $z_c$ for the transmitted soliton pulses, as defined below. The amplifier spacings can be of a similar dimension.

The propagation equation for solitons, including filter loss and compensating gain from the amplifying elements, is:

$$\frac{\partial u}{\partial z} = i\left[\frac{1}{2} \frac{\partial^2 u}{\partial t^2} + u * u^2\right] + \frac{1}{2}\left[\alpha - \eta\left(i\frac{\partial}{\partial t} - w_f\right)^2\right]u,$$

where $\alpha$ and $\eta$ are the excess gain and filter strength, respectively, per unit length and where $\omega_f$ is the nominal peak or center frequency of an optical filter per unit length. Since the center frequency $\omega_f$ of each filter is shifted with distance, we define a sliding rate $\omega'_f = d\omega_f/dz$. Although the quantities $\alpha$ and $\eta$ are characterized as continuously distributed quantities, they are easily converted into lumped, periodic equivalent quantities consistent with the use of lumped periodic amplifying and filtering elements in U.S. Pat. No. 5,357,364.

As mentioned above, instead of the real units of meters, seconds, Gigahertz, etc., it is possible to use the special soliton units $z_c$, $t_c$, and $\omega_c$, respectively. The soliton unit length, $z_c$, is a characteristic length for dispersive effects, and is given by:

$$z_c = 0.322 \frac{2\pi c}{\lambda^2} \frac{\tau^2}{D},$$

where c is the vacuum speed of light, $\lambda$ the wavelength of the soliton pulse, $\tau$ the full-width at half maximum (FWHM) of the soliton in time, and D is the optical fiber group delay parameter or dispersion represented in units of time/unit wavelength-shift/unit length. Within the context of ultra long distance soliton transmission, $z_c$ is typically at least many hundreds of kilometers long. The soliton unit time, to, is:

$$t_c = \frac{\tau}{2\cosh^{-1}\sqrt{2}} = \frac{\tau}{1.762747} \cdots,$$

where $\tau$ is the full width at half maximum of the soliton pulse. Finally, the soliton unit frequency, $\omega_c$, is one radian per $t_c$.

For the present invention using NRZ data, laser 2, clock generator 5, data source 4, and intensity modulator 3 perform the generation of an intensity modulated NRZ optical signal. The periodic phase modulation signal at the bit rate frequency is appropriately delayed to advance or retard the "anti-Stokes" and "Stokes" pulse sequences so that only one such sequence appears in the middle of the data bit period. The optical signal wavelength is adjusted at laser source 2 so that the spectrum of one of the pulse sequences lies in a region of maximum transmission for the sliding frequency guiding filters while the spectrum of the other pulse sequence lies substantially in a region of minimum transmission for the sliding frequency guiding filters. As the optical signal propagates in the filtered transmission medium 7, only one pulse sequence evolves into clean soliton pulses. The other pulse sequence is removed by the action of the sliding filters. In other words, the filtered transmission medium eliminates all non-soliton components from propagating and supports the propagation of the soliton components as determined by the phase modulation of the NRZ signal.

FIG. 2(*a*) shows the phase modulation of the cw signal produced by the modulator 4 as a function of time while FIG. 2(b) shows the frequency deviation δω(t) as a function of time. The instantaneous phase of the modulated signal is, $$\Phi(t) = A \sin(\Omega t) + \Phi_0,$$

where $\Omega$ is the modulation frequency and A is the modulation amplitude. As a result of the phase modulation, the instantaneous optical frequency of the modulated signal, ω(t), also changes with time. The optical frequency deviation is defined as, $$\delta\omega(t) \equiv \omega(t) - \omega_0,$$

where $\omega_0$ is the initial frequency of the cw signal from laser source 2. As a result, $$\delta\omega(t) = \frac{\partial \Phi(t)}{\partial t} = A\Omega \cos(\Omega t).$$

As FIG. 2 indicates, the signal frequency chirp is zero at those times when the carrier frequency deviation |δω(t)| reaches its maximum value. This can be expressed mathematically as follows: $\partial(\delta\omega(t))/\partial t = 0$ when $t = T \cdot n/2$, where $n = 0, \pm 1, \pm 2 \ldots$, and $T = 2\pi/\Omega$. Those frequencies for which the frequency deviation reaches a maximum are indicated by the horizontal dashed lines in FIG. 2(b) through 2(d). These frequencies define the anti-Stokes and Stokes pulse sequence components of the phase modulated cw signal. Each of these components defines a pulse sequence that comprises the desired high quality, high repetition-rate pulses. The two pulse sequences generated by the cw laser and the modulators are shown in FIGS. 2(c) and 2(d). As depicted in FIGS. 2(c) and 2(d), nearly transform-limited (i.e., chirp-free) pulses can be obtained at the appropriate wavelength and at a repetition rate R=1/T determined by the phase modulation frequency.

In accordance with this invention, the adjustable delay element 9 and the frequency of laser source 2 are controlled to cause either the Stokes or the anti-Stokes spectral components of the phase modulated cw signal to be selected by the transmission medium 7 for propagation to the receiver. An important advantage achieved by this invention is that the generation of the pulse sequence is independent of the constant phase bias $\Phi_0$. As such, this optical pulse source is insensitive to any drift of the phase bias, which is inherent in most known practical modulators.

Figure 3A:
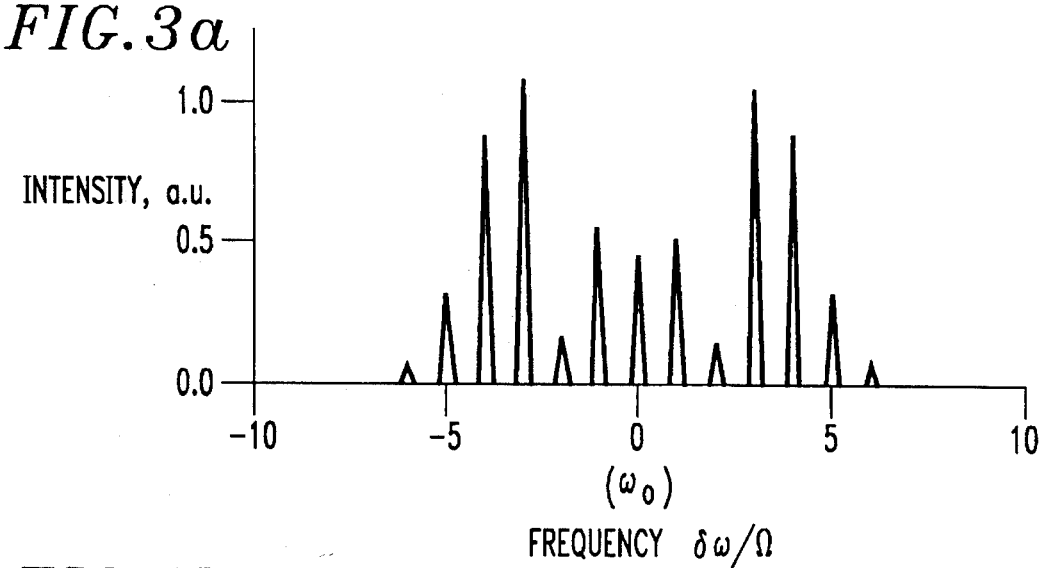
FIGS. 3(a)–3(c) show spectral components of the optical signals generated in the apparatus shown in FIG. 1.
Figure 3B:
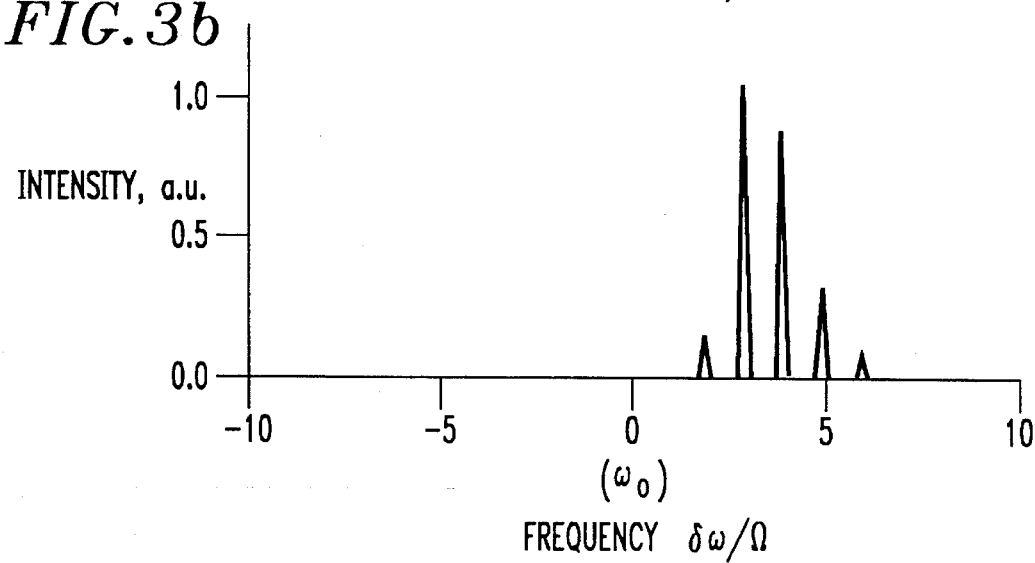
Figure 3C:
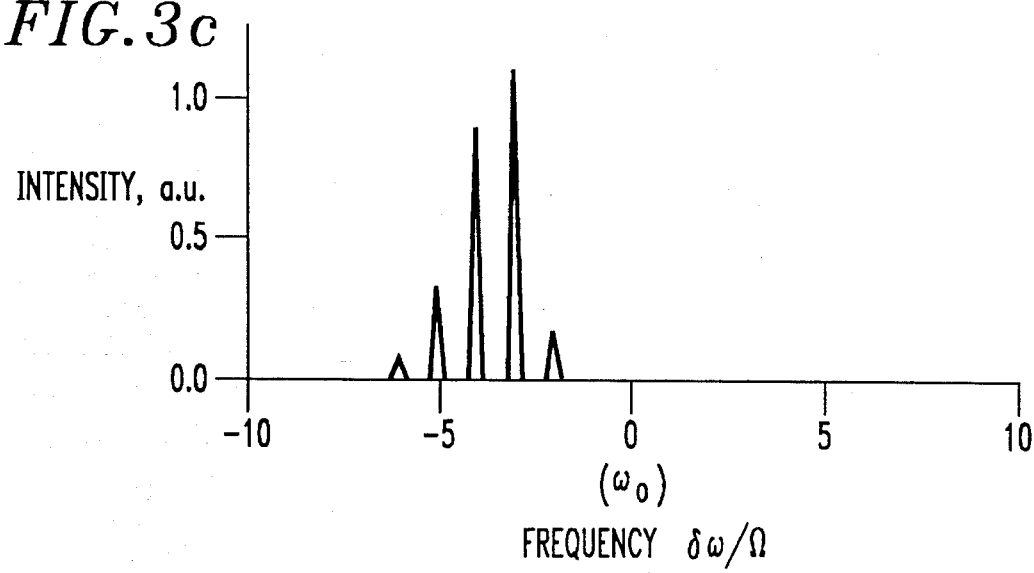

FIG. 3 shows the frequency spectra for simulated pulse sequences when the cw laser signal is phase modulated in accordance with the equations above and the phase modulation A is set equal to 1.5π. In particular, FIG. 3(a) shows the frequency spectrum as a function of the frequency deviation δω(t) (δω(t)=0 is the frequency of the unmodulated cw signal) after the cw signal has undergone phase modulation but before it has been filtered by the sliding frequency guiding filters in transmission medium 7. FIGS. 3(b) and 3(c) show, respectively, the anti-Stokes and Stokes components of the signal after it has passed through a sufficient number of sliding frequency guiding filters in the transmission medium. As a comparison of FIG. 3(a) with FIGS. 3(b) and 3(c) reveals, the source frequency can be controllably set with respect to the nominal center frequency of the sliding frequency-guiding filters so that the filtered transmission system removes the carrier frequency and the pair of sidebands nearest to the carrier frequency together with either the Stokes components or the anti-Stokes components, as the case may be. The actual number of sidebands removed from the modulated signal can be varied and depends on the particular application for which the pulse sequences are employed.

The spectral separation between the Stokes and anti-Stokes pulse sequences increases with the phase modulation amplitude A, since the mean frequencies of the two pulse sequences correspond closely to the extrema of the instantaneous optical frequency created by the phase modulation. Consequently, the difference between the mean, or carrier frequencies of the pulse sequences can be estimated as, $$\Delta\omega = \delta\omega(\Omega t = 0) - \delta\omega(\Omega t = \pi) = 2A\Omega.$$

A more accurate expression for the difference between the carrier frequencies of the pulse sequences as obtained from numerical simulation shows that, $$\Delta\omega \approx 1.924(A - 0.9) \cdot \Omega.$$

This equation provides a very good approximation of Δω for a modulation amplitude A equal to π–7π.

Figure 4:
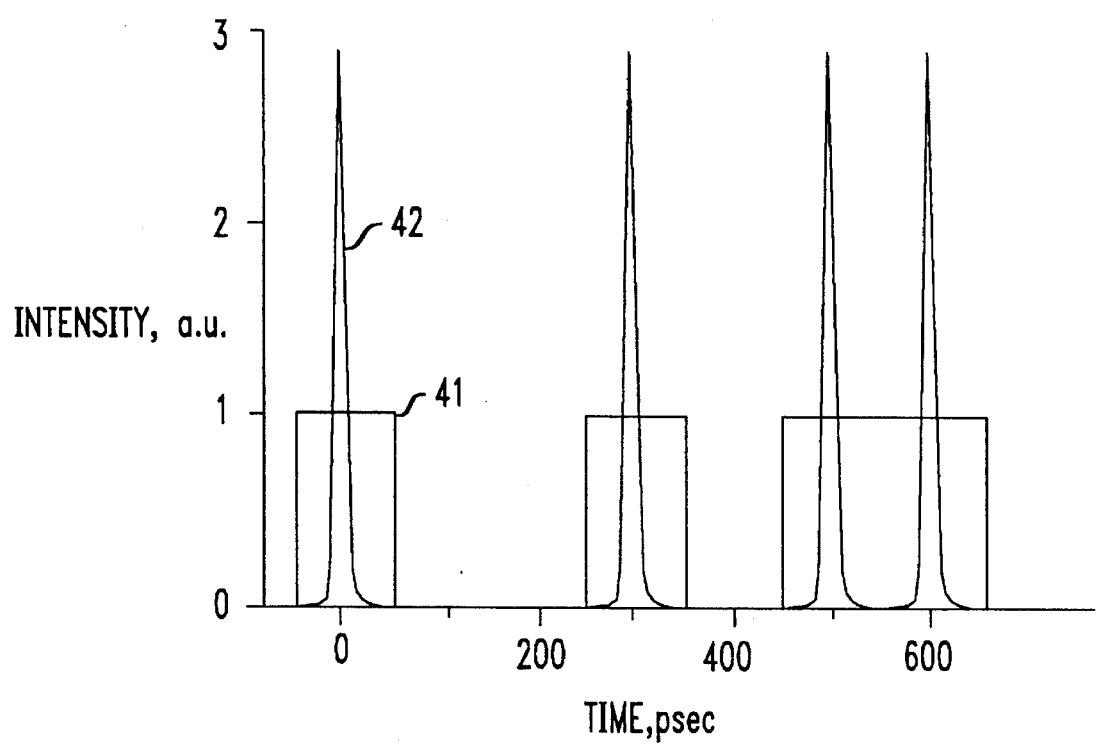
FIG. 4 shows a comparison between an input NRZ data bit sequence and the corresponding soliton pulse sequence emerging from the transmission system.

FIG. 4 shows numerical simulation results in which the logical "1" NRZ data bits such as bit 41 are shown with their corresponding soliton pulses such as pulse 42. The soliton pulse were extracted from the filtered transmission system after approximately 10 Mm of propagation. The data sequence shown in the figure, starting at time zero, is the cyclically shifted 7-bit Barker sequence 1001011.

In an example from experimental practice, laser source 2 produced a cw output signal at a wavelength of approximately 1557 nm. The clock generator operating at a clock rate of 10 GHz. clocked data from the data source at 10 Gbps. Data bits were encoded in an NRZ format. The NRZ data was used to modulate the intensity of the cw signal from the laser source. Phase modulation was performed using the 10 GHz. sinusoidal clock signal wherein the amplitude of the modulation was approximately ±0.7π. Transmission medium 7 comprised a 100 km recirculating optical fiber loop having three optical fiber spans of 33 km each, one erbium doped optical fiber amplifier following each span together with an optical filter. The optical fiber exhibited a zero dispersion wavelength of 1549 nm and a dispersion slope of approximately 0.07 ps/nm²·km. The optical filter was an air-gap etalon having mirror reflectivities of approximately 9%, a free spectral range of approximately 75 GHz, and piezo-scanning at 12 GHz/Mm. By adjusting the delay element and the source wavelength, it was possible to produce (select) solitons from either the Stokes or the anti-Stokes sideband. During signal propagation in the filtered transmission medium, the pulses evolved into clean soliton data bits similar in shape to the pulse shown in FIG. 4. Over a 10 Mm transmission path, error free transmission was obtained with large safety margins. In practice, the large safety margins are with respect to time phase margin at the receiver and with respect to amplitude (intensity) variations from one pulse to the next. The large time phase margin has been quantified for 10 GHz data on a 10 Mm system as a 40–50 ps difference from the expected arrival time of pulses at the receiver. Moreover, the amplitude fluctuations are forced into standard height alignment by the filtered transmission system.

From experimental practice, it is now clear that the data transmission is capable of high, long term stability without the use of stabilization circuits. Moreover, the highly specialized filtered transmission line used in this invention is extremely tolerant to signals which have large non-soliton components such as the signals output by the phase modulator. As a result, the phase modulated NRZ or RZ signal can be used directly for soliton transmission over the filtered transmission line without the need for and intermediate electronic signal regeneration.

Phase modulation and intensity modulation are shown in a particular order in FIG. 1 and are described in accordance with that illustrative embodiment. Because of the linearity principle, it should be understood that the order of these operations can be reversed without affecting the operation or results obtained for the invention.

While the present invention is described in terms of a single channel or single frequency soliton system, the teachings of the present invention can be readily extended to frequency-division-multiplexed systems utilizing a plurality of different soliton frequency channels, as well.

What is claimed is:

1. A method of soliton transmission using a non-soliton source, the soliton transmission being in the form of an optical pulse sequence, the method comprising the steps of:
   generating a cw optical signal;
   modulating the intensity of the cw optical signal with data bits in a predetermined data encoding format;
   phase modulating the intensity modulated optical signal to generate both Stokes and anti-Stokes components of the intensity modulated optical signal; and
   transmitting the phase and intensity modulated optical signal on a filtered transmission system comprising a plurality of sliding frequency guiding optical filters; and
   aligning the optical frequency of the cw optical signal with an optical frequency response characteristic of the filtered transmission system in order to allow the filtered transmission system to select at least one of the Stokes or anti-Stokes components of the optical signal and thereby propagate the one optical pulse sequence.

2. The method as defined in claim 1 wherein the phase modulating step comprises the step of phase modulating the optical signal with a sinusoidal modulation having a prescribed frequency and amplitude.

3. The method as defined in claim 2 further comprising the step of coordinating the steps of intensity and phase modulating so that frequency deviation maxima and minima occur in mid-bit periods for Stokes and anti-Stokes optical pulse sequences.

4. The method as defined in claim 2 wherein the prescribed frequency of phase modulation is a data bit rate frequency for the data bits.

5. The method as defined in claim 1 wherein the predetermined data encoding format of the intensity modulating step is selected from the group consisting of NRZ and RZ formats.

6. The method as defined in claim 1 wherein a centroid of the selected Stokes or anti-Stokes frequency components is substantially centered midway between 3 dB points of a frequency response characteristic of a first one of the sliding frequency-guiding filters.

7. Apparatus for soliton transmission using a non-soliton source, the soliton transmission being in the form of an optical pulse sequence, the apparatus comprising:
   a laser source for generating a cw optical signal;
   an intensity modulator optically coupled to the laser source responsive to the cw optical signal and data bits in a predetermined data encoding format;
   a phase modulator optically coupled to the intensity modulator for generating an output signal having both Stokes and anti-Stokes components of the intensity modulated optical signal; and
   a filtered transmission system comprising a plurality of sliding frequency guiding optical filters supporting transmission of the output signal from the phase modulator; and
   said laser source having the frequency of the cw optical signal in predetermined alignment with an optical frequency response characteristic of the filtered transmission system so that the filtered transmission system selects at least one of the Stokes or anti-Stokes components of the output signal and thereby propagate the one optical soliton pulse sequence.

8. A method of soliton transmission using a non-soliton source, the soliton transmission being in the form of an optical pulse sequence, the method comprising the steps of:
   generating a cw optical signal;
   modulating the phase of the cw optical signal to generate both Stokes and anti-Stokes components of the cw optical signal;
   modulating intensity of the Stokes and anti-Stokes components of the phase modulated optical signal with data bits in a predetermined data encoding format;
   transmitting the phase and intensity modulated optical signal on a filtered transmission system comprising a plurality of sliding frequency guiding optical filters; and
   aligning the optical frequency of the cw optical signal with an optical frequency response characteristic of the filtered transmission system in order to allow the filtered transmission system to select at least one of the Stokes or anti-Stokes components of the optical signal and thereby propagate the one optical pulse sequence.

9. The method as defined in claim 8 wherein the phase modulating step comprises the step of phase modulating the optical signal with a sinusoidal modulation having a prescribed frequency and amplitude.

10. The method as defined in claim 9 further comprising the step of coordinating the steps of intensity and phase modulating so that frequency deviation maxima and minima occur in mid-bit periods for Stokes and anti-Stokes optical pulse sequences.

11. The method as defined in claim 9 wherein the prescribed frequency of phase modulation is a data bit rate frequency for the data bits.

12. The method as defined in claim 8 wherein the predetermined data encoding format of the intensity modulating step is selected from the group consisting of NRZ and RZ formats.

13. The method as defined in claim 8 wherein a centroid of the selected Stokes or anti-Stokes frequency components is substantially centered midway between 3 dB points of a frequency response characteristic of a first one of the sliding frequency-guiding filters.

* * * * *